(12) United States Patent
Ponganis et al.

(10) Patent No.: US 7,706,526 B2
(45) Date of Patent: Apr. 27, 2010

(54) METHOD AND APPARATUS FOR POWERING ELECTRONICS ASSOCIATED WITH A TELEPHONE LINE TWISTED PAIR

(75) Inventors: Edward P. Ponganis, Modesto, CA (US); Luis R. A. Larzabal, Mountain View, CA (US)

(73) Assignee: Phylogy, Inc., Santa Clara, CA (US)

( * ) Notice: Subject to any disclaimer, the term of this patent is extended or adjusted under 35 U.S.C. 154(b) by 906 days.

(21) Appl. No.: 11/247,772

(22) Filed: Oct. 11, 2005

(65) Prior Publication Data

US 2007/0116256 A1    May 24, 2007

(51) Int. Cl.
*H04M 1/00* (2006.01)
*H04M 9/00* (2006.01)

(52) U.S. Cl. ........................................ 379/413
(58) Field of Classification Search ............... 379/413
See application file for complete search history.

(56) References Cited

U.S. PATENT DOCUMENTS

| | | | | |
|---|---|---|---|---|
| 4,373,117 A | * | 2/1983 | Pierce | 379/93.36 |
| 4,395,590 A | * | 7/1983 | Pierce et al. | 379/93.36 |
| 4,578,533 A | * | 3/1986 | Pierce | 379/93.31 |
| 5,408,525 A | * | 4/1995 | Eldering | 379/162 |
| 6,507,606 B2 | | 1/2003 | Shenoi et al. | |
| 6,829,292 B1 | | 12/2004 | Shenoi | |
| 6,909,943 B2 | | 6/2005 | Lehr et al. | |
| 2002/0106012 A1 | | 8/2002 | Norrell et al. | |
| 2002/0106076 A1 | | 8/2002 | Norrell et al. | |

* cited by examiner

*Primary Examiner*—Alexander Jamal
(74) *Attorney, Agent, or Firm*—Barry N. Young (57) ABSTRACT

Apparatus and methods for deriving power from an active POTS twisted pair of lines for powering associated auxiliary electrical devices, such as signal processing electronics, includes a power supply for providing a regulated DC voltage and current, and a current regulator for limiting the current flowing in the twisted pair to a predetermined value that does not disrupt the normal signaling and operation of the telephone circuit. Another current regulator in the power supply limits the input current from the twisted pair during power surges to another predetermined value that prevents line latching in an off hook condition. A shared power arrangement derives power from a plurality of twisted pairs and powers another plurality of auxiliary electrical devices in parallel, thereby limiting the line current of any one twisted pair to a value that avoids disrupting the normal operation of the telephone circuit.

17 Claims, 6 Drawing Sheets

METHOD AND APPARATUS FOR POWERING ELECTRONICS ASSOCIATED WITH A TELEPHONE LINE TWISTED PAIR

BACKGROUND OF THE INVENTION

Most telephone companies today provide analog telephone and other services to customers using a legacy infrastructure comprising a single twisted pair (TP) of wires for each telephone number. Conventional analog telephone service is often referred to as a plain old telephone service (POTS), and the twisted pair is referred to as a POTS line pair, or simply as a POTS TP. In some instances, it is desirable to locate auxiliary electronic devices or equipment associated with the twisted pair at locations other than either the service provider's central office (CO) or the customer's premises (CP). This is particularly the case where the telephone company offers other types of services to customers, such as broadband data services, e.g., DSL services, where it may be desirable to employ signal processing electronics such as amplifiers, line equalizers, or signal boosters, for instance, at an intermediate location on the TP lines. Providing operating power to such electronics in the field, particularly at remote locations, can be difficult and challenging. If an AC power grid is accessible at the remote location, it may be tapped to provide operating power to the electronics. However, this is not always either convenient or an option. It requires technicians in the field to deal with high voltage wiring, and the power company may not permit technicians other than their own personnel to access the power grid.

Another approach for powering remote devices associated with a first twisted pair of lines is to use one or more other twisted pairs of lines from the central office that are not active, i.e., that are not used for providing voice, data or other services to customers, to carry power to the remote devices. In some cases, multiple lines from the CO may be tied together (bonded) in order to power electronics associated with one active twisted pair. This is disadvantageous since using inactive lines for providing power uses valuable resources, making them otherwise unavailable, may consume large amounts of power, and is otherwise not cost effective.

Another approach, which is also problematic and which generally has been less than successful, attempts to extract power from an active twisted pair of lines to power electronic circuits. The telephone company uses DC and AC currents for line signaling and control of POTS service. Schemes that extract power from the twisted pair can interfere with the normal signaling and control functions provided by these DC and AC currents and disrupt the POTS service or cause other problems on a line. Accordingly, such approaches have been feasible only in limited situations.

There is a need for flexible and convenient approaches for powering remote electronics associated with an active twisted pair of telephone lines that address the foregoing and other disadvantages of known approaches. In particular, it is desirable to provide systems and methods for powering remote electronics from an active twisted pair of telephone lines which is being used by a service provider for providing services to customers without disrupting or interfering with these services, and it is to these ends that the present invention is directed.

SUMMARY OF THE INVENTION

The invention enables operating power for auxiliary electrical devices, such as signal processing and other types of electronics devices, used with an active twisted pair of telephones lines over which a service provider provides a service to be derived from the active pair of lines without disrupting or interfering with the normal service operation of the lines. More particularly, the invention affords apparatus and methods that extract power from one or more signals carried on the active telephone lines, and convert this power to a suitable operating power for auxiliary devices that process signals on the same twisted pair of lines.

In one aspect, the invention provides a power supply adapted to be connected to a twisted pair at a location between a central office and a customer's premises. The power supply receives a voltage and current from one of the lines, and provides a preselected output voltage to an auxiliary electrical device and a return current to the second line. A current regulator adapted to be disposed in the second line, receives this return current, and regulates and limits the current flowing in the second line from the customer premises such that the total current flowing to the central office is less than a predetermined value.

In another aspect, the invention provides an apparatus for powering auxiliary electrical devices from a plurality of twisted pairs in a shared power arrangement. Each of the twisted pairs includes a power supply that receives a voltage and current from one of the lines, provides a preselected output voltage to an associated auxiliary electrical device, and provides a return current to the second line. A first current regulator adapted to be disposed in the second line, receives this return current, and regulates and limits the current flowing in the second line from the customer premises such that the total current flowing to the central office is less than a first predetermined value. A second current regulator in a return line to the power supply from the auxiliary device limits the return current to the power supply to a second predetermined value. The plurality of power supplies of the plurality of twisted pairs have their output terminals connected in parallel to share power to one or more auxiliary electrical devices so that no twisted pair of the plurality has a total return current in excess of a third predetermined value.

DESCRIPTION OF PREFERRED EMBODIMENTS

The invention provides apparatus and methods that are particularly well adapted for extracting power from conventional POTS twisted pair telephone lines to provide operating power to signal processing electronics that increases the bandwidth of the lines and/or the distance over which high speed data can be provided, and will be described in that context. It will be appreciated, however, that this is illustrative of only one utility of the invention, and that the invention may be used for deriving power for other types of electronic circuits and devices and in other contexts.

Figure 1:
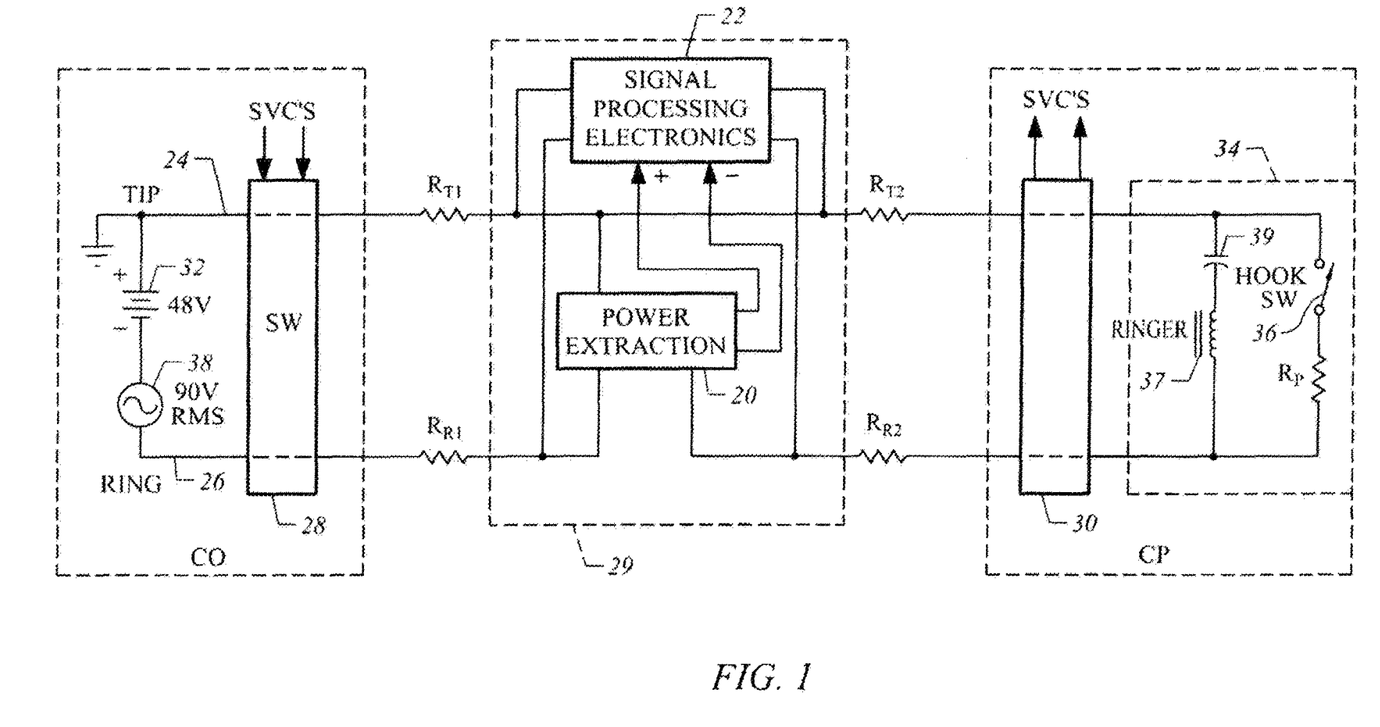
FIG. 1 is a diagrammatic view of power extraction apparatus in accordance with a first embodiment of the invention for deriving operating power for signal processing electronics from an active twisted pair of telephone lines.

FIG. 1 illustrates schematically a generalized equivalent circuit for a POTS twisted pair telephone line system, and shows in block diagram form power extraction apparatus 20 in accordance with the invention that derives power from the POTS twisted pair for powering auxiliary signal processing electronics 22. As shown in FIG. 1, the twisted pair comprises a "Tip" line 24 and a "Ring" line 26 which extend from a telephone central office (CO) and a service provider switch 28 to service customer premises equipment (CPE), such as a telephone 34 located at the customer's premises (CP). The CO switch 28 may multiplex multiple services for the customer onto the two POTS TP lines 24, 26. Examples of services may include voice, data, dial-up, video, audio, etc. The distance between the CO and the CP over which the twisted pair of POTS lines 24, 26 extends may be several tens of thousands of feet. The twisted pair may comprise a number of different lengths or sections of unshielded twisted pairs of electrical conductors, such as copper wire, of various gauges, connected to intervening circuits and/or switches to form a contiguous twisted pair line path between the CO and the CP. The twisted pair carries DC and AC currents between the CO and the CP. The DC and low frequency AC currents are used for control and signaling purposes by the telephone company, and higher frequency AC currents from the audio frequency range up to about 1-2 MHz, for instance, are used for normal telephone, data and other types of services including, for example, DSL (Digital Subscriber Lines) services. The power extraction apparatus 20 and the signal processing electronics 22 may comprise either one assembly 29 or separate units disposed at an intermediate location on the TP between the CO and the CP. At the CP, a hybrid or other such device 30 may demultiplex telephone audio and other services from the TP.

As shown in FIG. 1, the Tip line 24 is normally grounded at the CO and maintained at 0 volts. A 48 volt battery 32 at the CO applies −48 volts DC to the Ring line 26. When a telephone 34 at the CP is "on hook" (not in use) a hook switch 36 of the telephone is open and substantially no DC current flows through the circuit from the CO to the CP over the twisted pair. When the phone is "off hook", i.e., in use or busy as when a user picks up the handset or presses a speaker-phone button to use the phone, the hook switch is closed and a DC current does flow through the circuit. A principal function of this DC current is to enable the CO to determine when the phone is off hook. AC currents are used for ringing the phone, for dialing, and for voice or other services. To ring the telephone, the CO applies a low frequency AC ring voltage of approximately 90 volts RMS to the Ring line 26 from a ring signal generator 38. The AC ring current flows over the twisted pair to a ringer 37 in the telephone coupled to the TP by a capacitor 39 for signaling an incoming call. The dial signaling, voice and data AC voltages are typically of the order of a few volts or less. The "off hook" condition of the phone is the state that allows dialing and voice transmission.

When the phone 34 is off hook, it presents a resistance $R_p$ of the order of 300 ohms across the Tip and Ring TP lines, and has a voltage of the order of 6 volts DC across it. This results in a DC current flow of the order of 20 mA through the telephone circuit. The Tip and Ring TP lines have a substantial distributed resistance. In FIG. 1, this resistance is represented by the resistors $R_{T1}$ and $R_{T2}$ in the Tip line, and the resistors $R_{R1}$ and $R_{R2}$ in the Ring line. The values of these resistors depend upon, among other things, the distances between the CO and the CP, the intermediate location of the power extraction apparatus, and the types and gauges of wire that constitute the twisted pair path. For example, the resistance of 26-Gauge AWG copper twisted pair is of the order of approximately 286 ohms per kilometer. When the telephone goes off hook, the distributed resistance of the TP causes a substantial voltage drop from the 48 volts at the CO due to the DC current flow through the lines. When the DC current flowing through the telephone circuit exceeds a pre-selected value, e.g., typically 20-24 mA, an off hook current sensor or detector (not shown) in the CO indicates to the CO that the phone is off hook.

In accordance with the invention, power extraction apparatus 20 is inserted across the Tip and Ring lines 24, 26 at an intermediate location between the CO and the CP. The power extraction apparatus extracts DC power from the lines to provide operating power to signal processing electronics 22 or other auxiliary electronics devices which may process one or more of the service signals on the twisted pair. The signal processing electronics may include, for example, signal gain or line equalization circuits to compensate for losses on the twisted pair to increase the distance over which high speed data can be provided or to increase the bandwidth of the line for higher speed data transmission such as DSL. As will be described in more detail shortly, power extraction apparatus 20 extracts DC power from the twisted pair 24, 26 in a manner that does not adversely affect the performance or operation of the normal POTS telephone circuit, and provides a stable, constant source of operating power to the signal processing electronics or other devices. The power extraction apparatus 20 and signal processing electronics 22 may comprise a single assembly 29, as mentioned, or may comprise separate units inserted into the twisted pair lines at substantially the same location or separated from one another.

Figure 2:
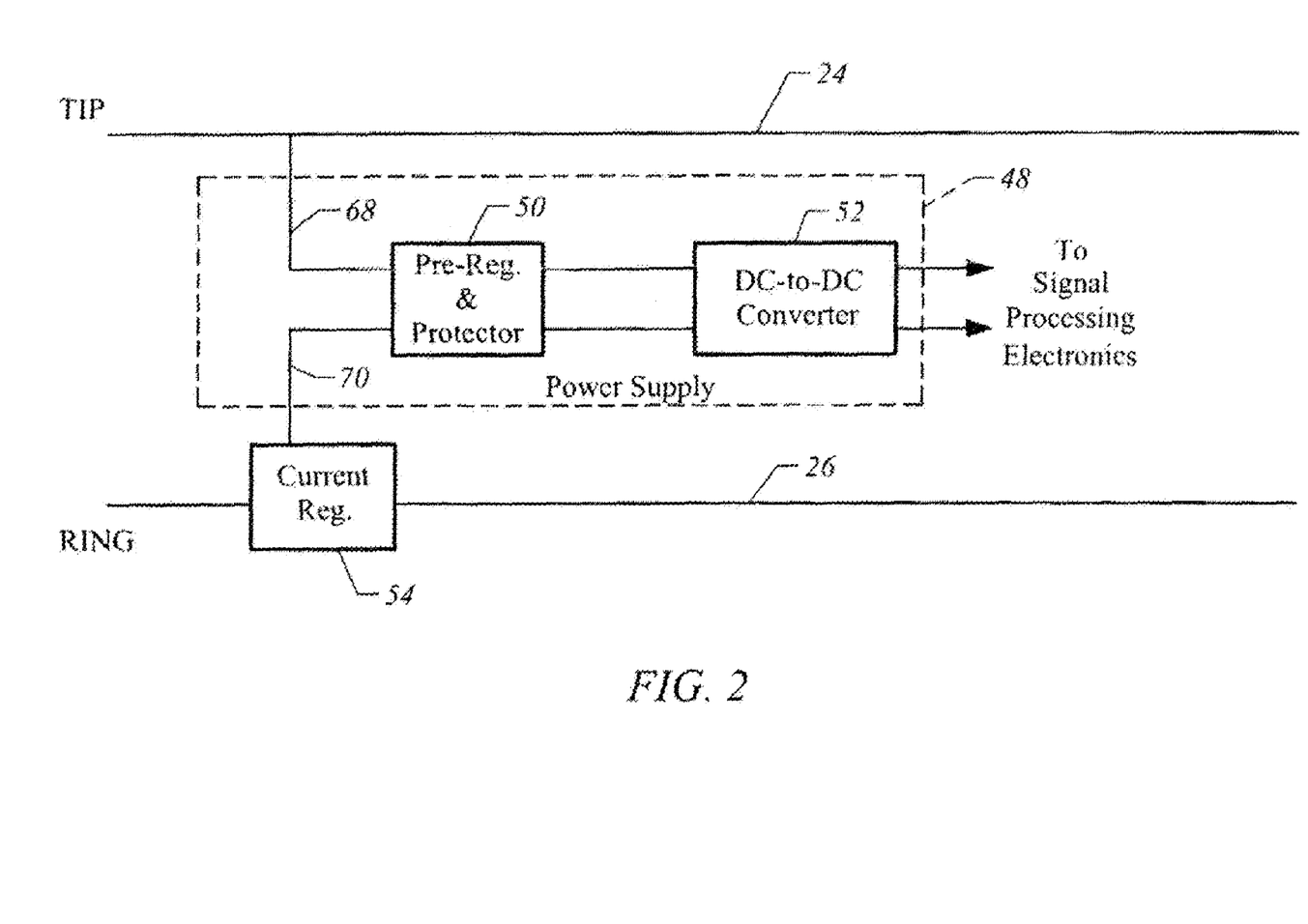
FIG. 2 is a block diagram that illustrates in more detail the power extraction apparatus of FIG. 1.

FIG. 2 is a block diagram of a first embodiment of power extraction apparatus 20 in accordance with the invention. As shown, and as will be described in more detail, the power extraction apparatus may include a power supply 48 comprising a power supply pre-regulator and protector 50, a DC-to-DC converter 52, and a current regulator 54. The power supply pre-regulator and protector 50 may connect directly to the Tip line, and connect to the Ring line through the current regulator 54, as indicated in FIG. 2. As will be described, the power supply pre-regulator and protector protects the DC-to-DC converter and insures that the converter receives a relatively constant input voltage, even when the voltages on the Tip and Ring lines experience changes due to ring or other signals, due to voltage spikes produced by transient events such as lightening, or due to environmental conditions. The power supply pre-regulator and protector may also insure that unwanted electrical noise, if any, from the signal processing electronics 22 is not introduced into the service path through the power supply 48. The current regulator 54, as will be described, serves to regulate and limit the DC current flow through the twisted pair to insure that the power supply and the signal processing electronics receive sufficient current to meet their operational needs, while limiting the amount of phone current from the CP to insure that the normal control signals on the Tip and Ring lines are not adversely affected and that normal POTS service is not disrupted.

As will also be described in more detail below, the DC-to-DC converter 52 preferably converts a higher voltage, lower current power received from the power supply pre-regulator and protector 50 into a stable lower voltage, higher current power for the signal processing electronics 22. For example, as will be described, the DC-to-DC converter may receive an input voltage in the range of 12 to 95 volts DC and produce an output voltage in the range of 2.5 to 10 volts DC.

Figure 3:
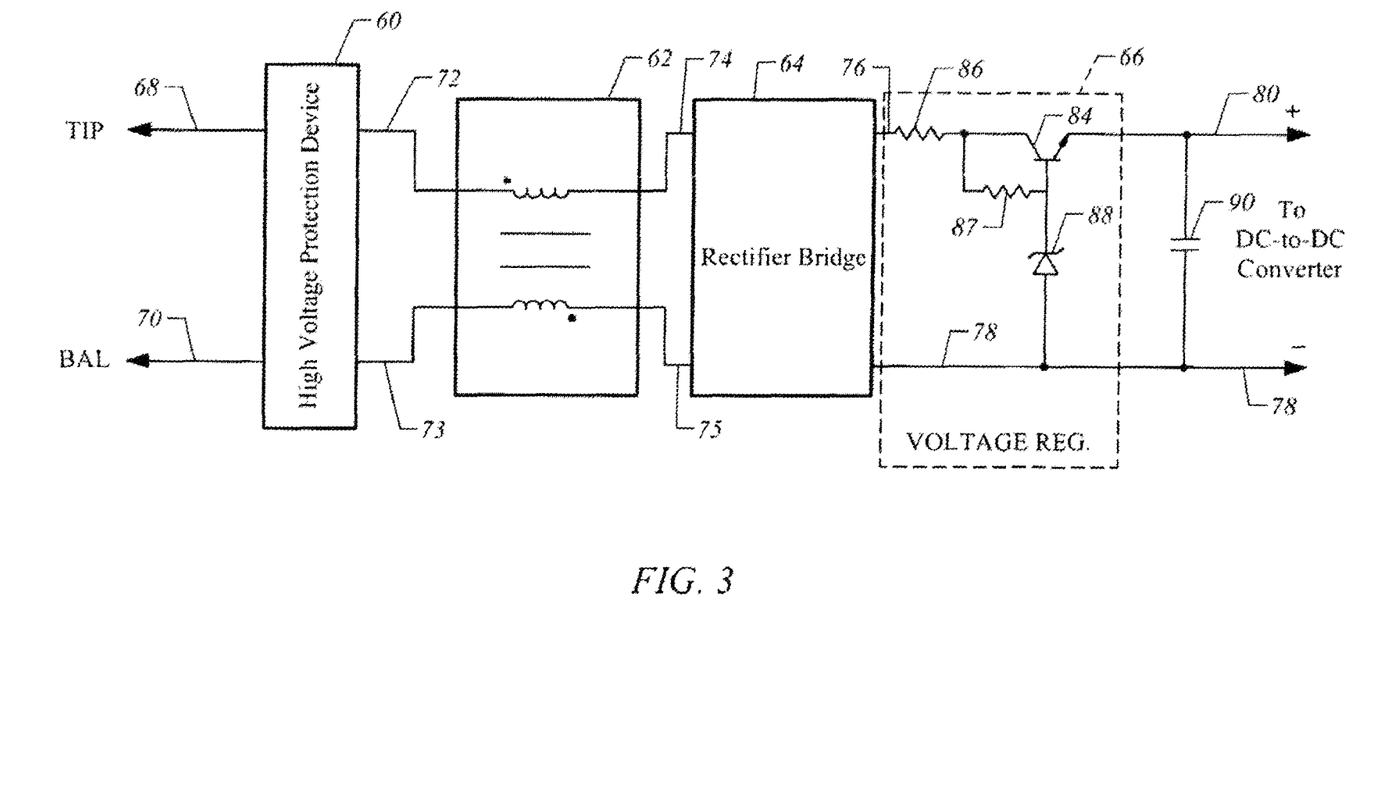
FIG. 3 is a block diagram of a power supply pre-regulator and protector of the apparatus of FIG. 2.

FIG. 3 illustrates a preferred embodiment of a pre-regulator and protector 50 of power supply 48 in accordance with the invention. As shown, the power supply pre-regulator and protector may include a high voltage protection device 60, a filter transformer 62, such as a toroid transformer, a rectifier bridge 64, and a voltage regulator 66. The high voltage protection device 60 may have input and return lines 68 and 70 connected, respectively, to the Tip line 24 of the TP and to a balance (BAL) line of the current regulator 54. These lines may be unprotected from the physical environment. Accordingly, the high voltage protective device 60, which may comprise, for example, a standard MOV (metal oxide varistor) surge protector limits power surges into the power supply pre-regulator and protector caused by random transient high voltages due, for example, to lightening. The high voltage protection device may be selected to limit the output voltage to a desired maximum voltage, such as 300 volts. This voltage is high enough to avoid interfering with the ring signal from the CO, which has a peak-to-peak value in the order of 250 volts, while providing reasonable protection from excessively high voltage spikes. The outputs 72, 73 from the high voltage protection device may be connected to the filter transformer 62, comprising magnetically coupled coils in anti-phase as, for example, a wound toroid transformer. The filter transformer prevents noise, which may affect service quality such as voice quality, from feeding back through the high voltage protection device 60 and on to the twisted pair.

The outputs 74, 75 from the filter transformer 62 may be connected to the rectifier bridge 64, such as a full-wave rectifier bridge. The rectifier bridge converts the DC and AC voltages on its input lines 74, 75 to a positive supply voltage on an output line 76 relative to a reference voltage, such as ground, on a return line 78. The rectifier bridge output voltage on line 76 can be greater than 90-100 volts during certain operating conditions, e.g., during ringing or lightening activity. Therefore, the voltage regulator 66 converts the voltage on line 76 from the rectifier bridge to a substantially constant and stable DC voltage on an output line 80 having a value that is selected to prevent damage to the DC-to-DC converter and enable the converter to supply operating power to the signal processing electronics.

As shown in FIG. 3, the voltage regulator 66 may comprise an NPN transistor 84 having its collector connected to output 76 of the bridge rectifier through a resistor 86, its base connected to a voltage reference device, such as a Zener diode 88, and its emitter connected to output line 80. Resistor 86 limits the current flowing into the transistor from the rectifier bridge. A second resistor 87 connected between the collector and the base of the transistor provides a current flow through the Zener diode 88 and biases the base of the transistor at the Zener breakdown voltage. The output voltage on the emitter of the transistor at 80 is equal to the Zener breakdown voltage minus the base-to-emitter p-n junction voltage of the transistor, which is typically approximately 0.7 volts. Accordingly, by selecting a Zener diode 88 that has a breakdown voltage of 51 volts, the output voltage of the regulator at 80 will be held to approximately +50 volts DC. A filter capacitor 90 may be connected across the output lines 78, 80 of the voltage regulator, as shown. To accommodate the ring voltage, transistor 84 preferably has a breakdown voltage of the order of 400 volts.

The DC-to-DC converter 52 converts the DC voltage at the output 80 of the voltage regulator 66 to an appropriate substantially constant and stable operating voltage for the signal processing electronics. The DC-to-DC converter may be a standard commercially available DC-to-DC integrated circuit step-down switching regulator, such as a type LM5008 integrated circuit available from National Semiconductor, Inc. This integrated circuit can accept input voltages in the range of 12 to 95 volts DC and produce a selected output voltage in the range of 2.5 to 10 volts DC. The product application brochure for the LM5008 illustrates circuit configurations and representative values of circuit elements for different desired output voltages. Preferably, the DC-to-DC converter is configured for an input of the order of 48 volts DC at a current of 10 mA, and an output of the order of 4 volts DC at 50 mA. This output serves as a stable DC power supply for the signal processing electronics 22.

When the phone is on hook, there is no DC current flow through the phone over the TP lines, and the voltage at the intermediate location of the power extraction apparatus 20 will be the difference between the 48 volts supplied to the Tip and Ring lines by the CO and the voltage drop due the current flowing through the distributed line resistance from the CO to the power extraction apparatus. This current is preferably selected to be of the order of 10 to 14 mA. When the phone is off hook, it acts as a 300 ohm resistor between the Tip and the Ring TP lines and has about 6 volts across it, resulting in an off hook current flow of the order of 20 mA, as previously described. The combined off hook current and the current to the power extraction apparatus flowing through the TP lines will result in a substantial voltage drop at the location of the power extraction apparatus 20, which may be reflected as a lower than expected input voltage to the DC-to-DC converter from output 80 of the voltage regulator 66. Under these conditions, the DC-to-DC converter will consume a greater amount of current than normal as it attempts to maintain the preset output voltage, producing, in turn, a greater voltage drop. If the voltage drops too low, the DC-to-DC converter may not operate properly. Moreover, the voltage drop may cause the DC-to-DC converter to continue drawing more current than the preset value of the off hook current detector at the CO when the phone goes back on hook, causing the CO to fail to recognize that the phone is back on hook and effectively latching the phone line in a "busy" condition.

To avoid these problems, the invention employs the current regulator 54 in the Ring line to regulate the current flowing through the phone when it is off hook and to limit the phone current to a pre-selected value, e.g., 10 mA. This limits the total current that would otherwise flow through the TP circuit during off hook conditions, and, accordingly, reduces the voltage drop that the power supply would experience. By limiting the off hook phone current to 10 mA, for example, the desired amount of current, e.g., 10 to 14 mA, will be available from the power supply for the signal processing electronics 22 even when the phone is off hook. Thus, when the phone goes back on hook, the line current will drop below the pre-set level of the off hook current detector at the CO so that the telephone service operates normally.

Figure 4:
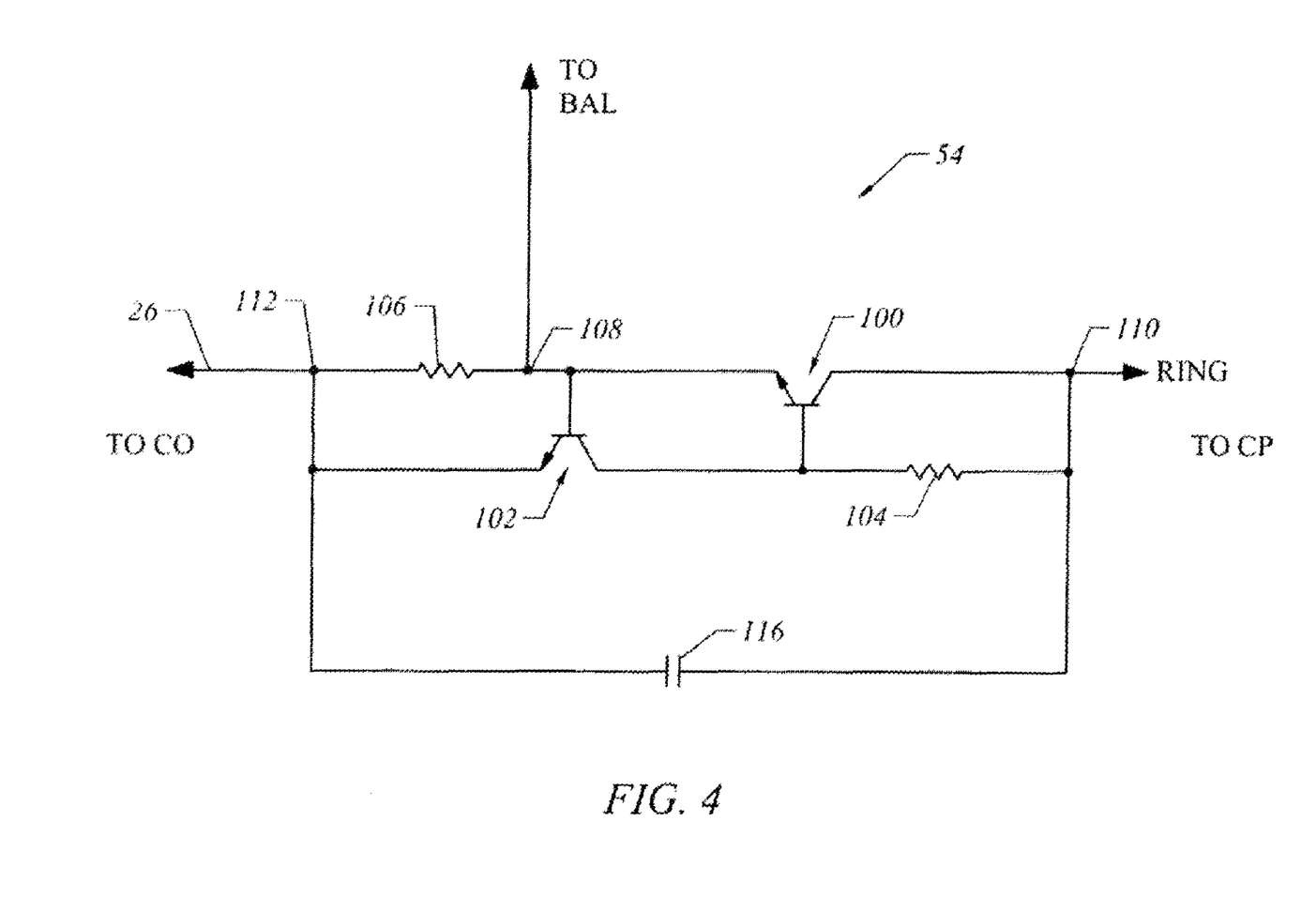
FIG. 4 is a schematic diagram of a Ring line current regulator and limiter of the apparatus of FIG. 2.

FIG. 4 illustrates a preferred embodiment of a current regulator 54 in accordance with the invention for automatically regulating and limiting the phone current flowing through the Tip and Ring TP lines. As indicated in FIGS. 2 and 4, the current regulator is preferably inserted into the Ring line 26. As shown in FIG. 4, the current regulator may comprise a pair of semiconductor devices 100, 102, such as NPN transistors, connected back-to-back in such a way as to monitor the total current flow to the CO in the Ring line and limit the current flow from the CP when the total current reaches a predetermined value.

Referring to FIG. 4, transistors 100, 102 and an associated pair of resistors 104, 106 may be connected together such that the base of transistor 100 is connected to resistor 104 and to the collector of transistor 102, and the emitter of transistor 100 is connected to the base of transistor 102 and to one side of resistor 106 at a node 108. The collector of transistor 100 and the other side of resistor 104 may be connected to the Ring line 26 coming from the TP at a node 110; and the emitter of transistor 102 and resistor 106 may be connected to the Ring line going to the CO at another node 112. In an off hook condition, a portion of the current flowing into node 110 from the phone flows through resistor 104 and into the base of transistor 100, turning the transistor on. This enables the phone current to flow from the emitter of transistor 100 through resistor 106 and the Ring line 26 to the CO. Current from the balance (BAL) terminal 70 of the high voltage protection device 60 of the power supply pre-regulator and protector 50 (see FIG. 3) enters the current regulator at node 108, and flows through resistor 106 to node 112 and to the CO. Thus, the total current flowing through resistor 106 is the sum of the phone current entering node 110 and flowing from the emitter of transistor 100 and the current from the BAL terminal 70 of the high voltage protection device entering the current regulator at node 108. As long as the voltage drop across resistor 106 due to the combined current is less than the voltage necessary to forward bias the base-to-emitter p-n junction of transistor 102 (approximately 0.7 volts), the transistor remains turned off and the current entering node 110 is not limited. However, as the current through resistor 106 increases, the voltage drop increases and starts to forward bias the base-to-emitter junction of transistor 102, which starts to turn the transistor on. As transistor 102 turns on, it reduces the base-to-emitter voltage of transistor 100, which starts to turn transistor 100 off. This, in turn, reduces the current flowing through the phone at the CP and into node 110. Accordingly, by appropriately selecting the value of resistor 106, the current regulator 54 can automatically regulate and limit the off hook DC phone current flowing through the twisted pair to a desired value.

Assuming a current flow of the order of 10 to 14 mA is desired for the power supply, and that this current flows into node 108 at the current regulator, if the value of resistor 106 is selected to be 33 ohms, the current regulator will limit the phone current during an off hook condition to a value of the order of 10 mA. Thus, the current regulator insures that sufficient current is available for the power supply so the DC-to-DC converter provides the desired constant and stable DC voltage for the signal processing electronics during an off hook condition, while limiting the total current so that when the phone goes back on hook the power supply current is less than the pre-set value of the off hook current detector at the CO. This allows normal operation of the telephone circuit when the phone goes back on hook. A capacitor 116 connected across the current regulator between nodes 110 and 112 provides an AC bypass for voice, ring and other AC signals so that the current regulator regulates only DC phone current flowing through the Ring line back to the CO.

The current regulator 54 of FIG. 4 works well to regulate and limit the current flowing through the phone during off hook conditions and when the power extraction apparatus is providing current in a desired range to the signal processing electronics. The current regulator 54 does not limit the current flowing into node 108 from the BAL terminal 70 of the high voltage protection device 60 and back to the CO. As indicated above, under certain operating conditions such as, for example, a significant voltage drop at the location of the power supply or a high voltage spike caused, for instance, by a transient condition on the TP, the current consumption of the DC-to-DC converter will increase as it tries to maintain the pre-set output voltage. If the current increases to a level that is greater than a pre-set value of the off hook current detector at the CO, the telephone line may "latch up" due to the excessive current flow, even though the phone is on hook. To prevent this situation, the invention also preferably regulates the current flowing into the DC-to-DC converter, and limits the current to a pre-selected value that is less than the pre-set value of the off hook current detector at the CO, e.g., less than about 20 mA. Preferably, the current to the DC-to-DC converter is limited to a value of the order of 14 mA, as will now be described.

Figure 5:
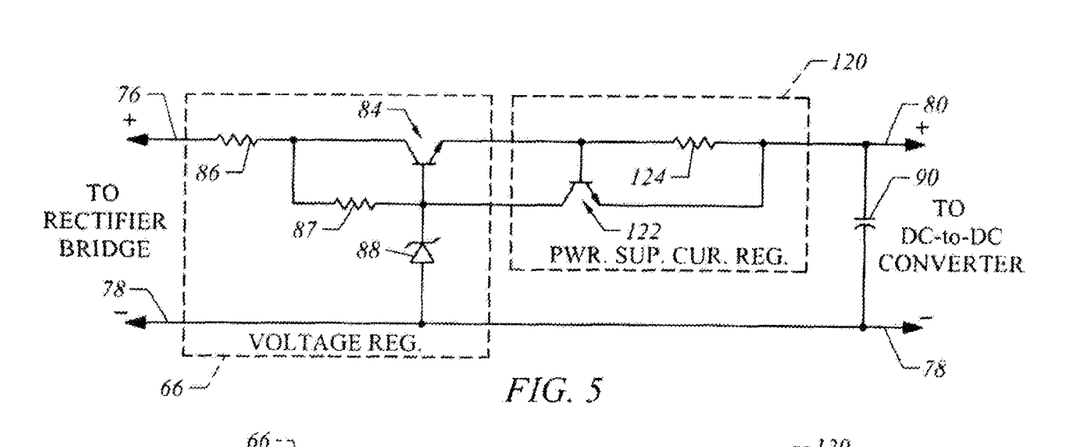
FIG. 5 is a schematic diagram of a power supply voltage regulator and current regulator in accordance with a second embodiment of the invention.

FIG. 5 illustrates an alternative embodiment of the invention that includes a power supply current regulator 120 disposed within the output line 80 of the voltage regulator 66 that powers the DC-to-DC converter. As shown in FIG. 5, the power supply current regulator may comprise an NPN transistor 122 and a resistor 124 connected to the power supply voltage regulator 66 such that the base of transistor 122 and one side of resistor 124 are connected to the emitter of the voltage regulator transistor 84; the collector of transistor 122 is connected to the base of transistor 84, and the emitter of transistor 122 and the other side of resistor 124 are connected to output line 80 to the DC-to-DC converter.

Under normal operating conditions, transistor 84 of the voltage regulator supplies the desired amount of current, e.g., 10 to 14 mA, to the DC-to-DC converter through resistor 124 of the power supply current regulator 120. The value of resistor 124 may be selected such that the voltage drop across the resistor produced by the normal current flow is less than the voltage required to forward bias the base-to-emitter p-n junction of transistor 122. Thus, transistor 122 remains turned off. However, should the current flow to the DC-to-DC converter increase, the voltage drop across resistor 124 will increase. When the current flow reaches a value such that the voltage drop across resistor 124 begins to forward bias the base-to-emitter junction of transistor 122, the transistor begins to turn on. As transistor 122 turns on, it reduces the base-to-emitter p-n junction voltage of transistor 84, which starts to turn off transistor 84. As transistor 84 turns off, the current flowing through resistor 124 to the DC-to-DC converter is reduced accordingly.

Thus, the current regulator 120 regulates and limits the current to the DC-to-DC converter to a desired maximum value. By appropriately selecting the value of resistor 124, the maximum value of the current drawn by the DC-to-DC converter can be set to insure that the total current flowing through the power supply 48 to the Ring line 26 and back to the CO is less than the pre-set current value of the off hook detector at the CO. Preferably, the value of resistor 124 is selected such that the maximum current to the DC-to-DC converter is set to a value, e.g., 14 mA, that is within the normal input current operating range of the DC-to-DC converter. Thus, should a transient or other abnormal condition which would produce excessive current flow occur during an off hook condition, the power supply current regulator 120 regulates the current flowing in the TP circuit so that when the phone goes back on hook, the current flow drops to a level below the off hook detector at the CO. This insures that line latch-up does not occur and the operation of the telephone circuit is not disrupted.

Figure 6:
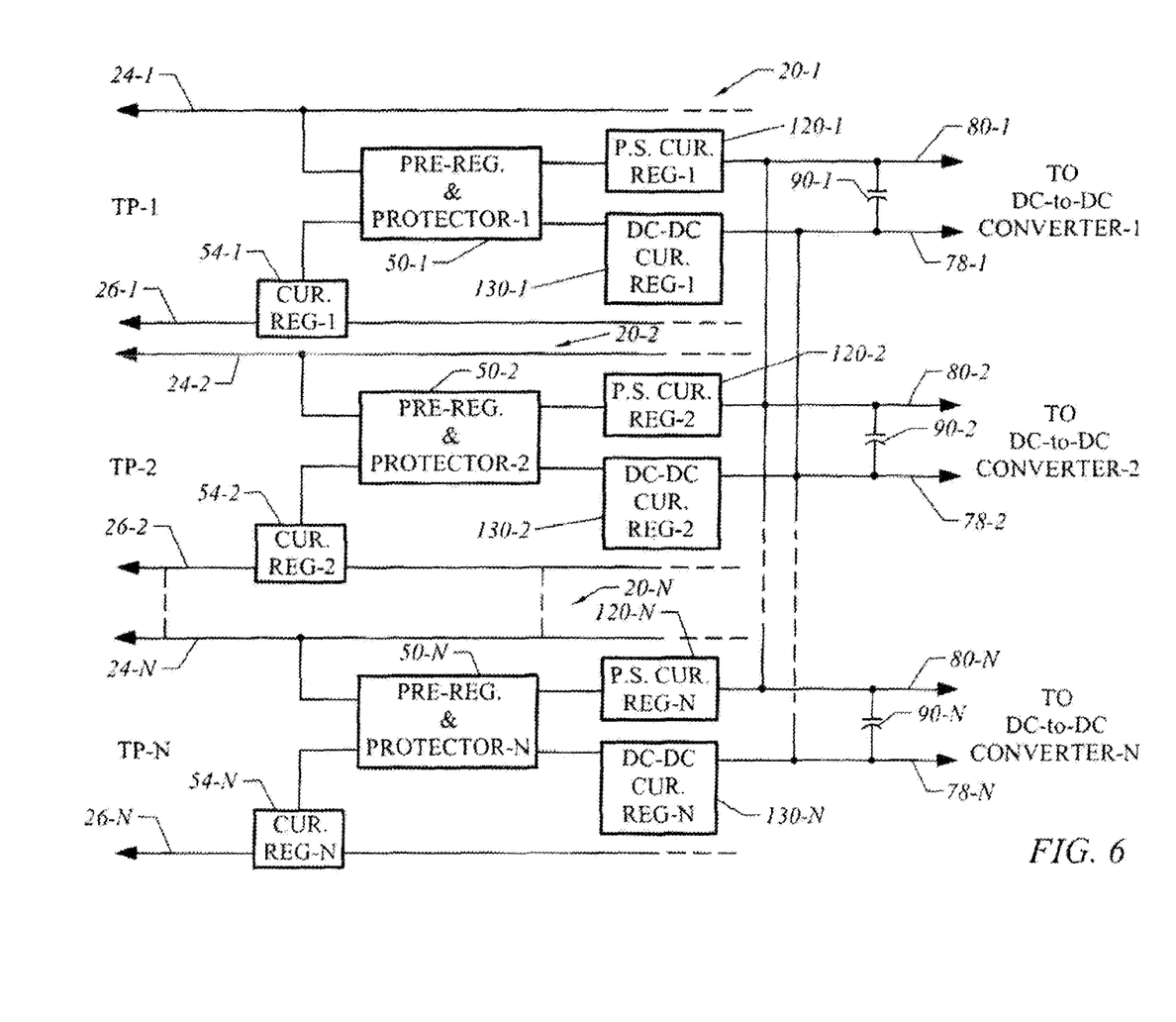
FIG. 6 is a block diagram of a third embodiment of the invention which derives shared power from pooled twisted pairs of lines.

FIG. 6 is a block diagram of another embodiment of power extraction apparatus in accordance with the invention that operates in a pooled or shared TP line arrangement. The telephone company typically provides a plurality of TP lines bundled together, such as in a 25-line group, from the CO to a location where the bundle of lines is terminated and individual TP lines are split off to separate customers. The lines are typically terminated at a binder within a canister, and it is convenient to derive power in a shared power arrangement from the bundled lines for powering the signal processing electronics or other devices for individual TP circuits. This pooled arrangement is illustrated in block diagram form in FIG. 6.

As shown, each of a plurality of TP line pairs TP-1, TP-2, . . . TP-N, may have an associated power extraction apparatus 20-1, 20-2, . . . 20-N that may be substantially the same as described above, each respectively comprising a power supply pre-regulator and protector 50-1, 50-2, . . . 50-N, a phone current regulator 54-1, 54-2, . . . 54-N and a power supply current regulator 120-1, 120-2, . . . 120-N for limiting the current to associated DC-to-DC converters. In addition, each power extraction apparatus may also have another current regulator 130-1, 130-2, . . . 130-N, connected in the negative return lines 78-1, 78-2, . . . 78-N from the DC-to-DC converters to the voltage regulators 66 of the power supply pre-regulator and protectors 50-1, 50-2, . . . 50-N, as shown in FIG. 6 and as is illustrated in more detail in FIG. 7. The power supply current regulators 120-1, 120-2, . . . 120-N limit the current flowing to the DC-to-DC converters as previously described. The current regulators 130-1, 130-2, . . . 130-N further limit the current consumption of associated DC-to-DC converters in the case of transient or other abnormal conditions, such as voltage spikes, for instance, which result in excessive current flow. Under such abnormal conditions, this excessive current flow may cause line latching, as previously described, as the DC-to-DC converter attempts to maintain the preset output voltage to the signal processing electronics. The pooled embodiment of FIG. 6 avoids this by allowing current sharing from the pooled TP lines. Lines that do not experience high current conditions may be used to provide a portion of the required current flow (which may be greater than the off hook detection value at the CO) for a line that requires such a flow to insure that the DC-to-DC converter of that line can maintain a stable output voltage and current to its associated signal processing electronics without causing line latching. The current regulator 130-1, 130-2, . . . 130-N in the return line from a DC-to-DC converter insures that the current flowing through the power supply pre-regulator and protector and to the balance terminal of the current regulator 54 remains less than the pre-set current value of the off hook detector at the CO. The shared power arrangement of FIG. 6 affords greater safety in the events that multiple lines experience high current conditions at the same time since it allows the excess current requirements to be distributed among all lines of the group.

Figure 7:
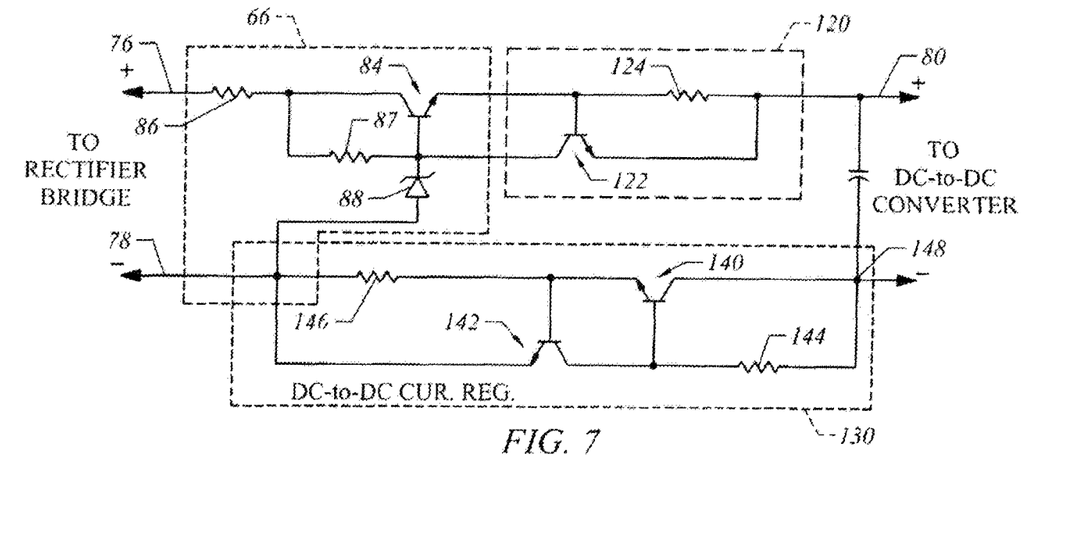
FIG. 7 is a schematic diagram of another current regulator employed in the third embodiment illustrated in FIG. 6.

FIG. 7 illustrates a preferred embodiment of a DC-to-DC converter current regulator 130 which may be used in the power extraction apparatus. As shown, the DC-to-DC converter current regulator 130 may be inserted into a return line 78 from the DC-to-DC converter to the voltage regulator 66 and the rectifier bridge 64. The current regulator 130 may comprise a pair of NPN transistors 140, 142 and a pair of resistors 144, 146 connected together in an arrangement similar to the current regulator 54 of FIG. 4. As shown, transistors 140 and 142 may be connected back-to-back with the emitter of transistor 140 connected to the base of transistor 142 and to one side of resistor 146, and the collector of transistor 142 connected to the base of transistor 140 and one side of resistor 144. The other side of resistor 144 may be connected to a node 148 in the return line 78 from the DC-to-DC converter, and the emitter of transistor 142 and the other side of resistor 146 may be connected to a node 150 in the return line 78 to the rectifier bridge. In addition, the anode of Zener diode 88 of the voltage regulator circuit 66 also may be connected to node 150, as shown.

The voltage regulator 66 and the current regulator 120 of the embodiment of FIG. 7 may function in substantially the same way as previously described in connection with the second embodiment illustrated in FIG. 5. The voltage regulator provides a substantially constant output voltage to the current regulator 120 under normal operating conditions, and the current regulator 120 limits the current flow to the DC-to-DC converter under abnormal operating conditions at which the converter would otherwise consume excessive current. Current regulator 130 further operates to regulate and limit the return current from the DC-to-DC converter under abnormal conditions to a desired pre-set level.

Referring to FIG. 7, under normal conditions current flowing from node 148 in the return line 78 through resistor 144 forward biases the base-to-emitter p-n junction of transistor 140, turning on the transistor. As long as the current flowing from the emitter of transistor 140 through resistor 146 to node 150 in the return line 78 to the rectifier bridge produces a voltage drop that is less than the base-to-emitter p-n junction voltage necessary to forward bias transistor 142 (approximately 0.7 volts), transistor 142 is turned off. However, if the current through resistor 146 increases due to the occurrence of an abnormal condition, such as a voltage spike, for example, the voltage drop begins to forward bias the base-to-emitter p-n junction of transistor 142, turning the transistor on. As transistor 142 turns on, it reduces the base-to-emitter voltage of transistor 140, which starts to turn transistor 140 off. Thus, by appropriately selecting the value of resistor 146 (for instance, to be the same as resistor 124 of current regulator 120) the current regulator 130 limits the current flowing in return line 78 to a desired value, e.g., 14 mA. This, in turn, limits the current flowing from the BAL line 70 of the high voltage protection device into node 108 of the current regulator 54, and through Ring line 26 back to the CO.

As shown in FIG. 6, by tying together all of the positive power supply lines 80-1, 80-2, . . . 80-N and all of the return lines 78-1, 78-2, . . . 78-N of the DC-to-DC converters in the pooled arrangement, a combined current may be shared from among the various power supplies. Accordingly, all of the DC-to-DC converters in the pooled arrangement are enabled to maintain a substantially stable output voltage and current to their associate signal processing circuits during abnormal conditions without drawing through any one TP line more than the pre-set off hook detector current. This avoids line latching or otherwise disrupting the normal operation of the telephone circuits of any of the twisted pairs of lines.

While the foregoing has been with respect to preferred embodiments of the invention, it will be appreciated that changes may be made to these embodiments without departing from the spirit and the principles of the invention, the scope of which is set forth in the appended claims.

The invention claimed is:

1. Apparatus for deriving power from a twisted pair of telephone lines for powering an auxiliary electrical device, comprising:

a power supply having first and second terminals for connection to said twisted pair at an intermediate location between a central office and a customer premises, the power supply receiving on said first terminal an input voltage and input current from a first line of said twisted pair and converting said input voltage and input current to a preselected output voltage and output current for powering said auxiliary electrical device, the second terminal of the power supply providing a return current to a second line of said twisted pair, the power supply having a first current regulator at an output thereof for limiting said output current to a first predetermined value less than an off hook current in said twisted pair; and a second current regulator adapted to be disposed in the second line of said twisted pair at said intermediate location for receiving current from the customer premises flowing in the second line to the central office, the second current regulator further receiving said return current from the second terminal of said power supply, and the second current regulator being responsive to the total current flowing in the second line to the central office corresponding to the combination of said current from said customer premises and said return current from said power supply for limiting the current from the customer premises such that the total current flowing in the second line is less than a second predetermined value during an off hook condition at the customer premises.

2. The apparatus of claim 1, wherein the power supply comprises a voltage regulator that provides said preselected output voltage and output current, and a converter that converts the preselected output voltage and output current to a substantially constant output power for powering said auxiliary electrical device.

3. The apparatus of claim 2, wherein the power supply further comprises a high voltage protection device that limits input power surges from the twisted pair caused by transient events to a predetermined maximum voltage that protects the power supply.

4. The apparatus of claim 2, wherein said first current regulator comprises a first semiconductor device responsive to the output current from said power supply for controlling a second semiconductor device in the voltage regulator to limit the output current to said first predetermined value.

5. The apparatus of claim 4, wherein said first and second semiconductor devices comprise first and second transistors, respectively, said first transistor being in a non-conducting state and said second transistor being in a conducting state when said output current is less than said first predetermined value, and said first transistor being responsive to said output current for controlling said second transistor to limit the output current to said first predetermined value.

6. The apparatus of claim 1, wherein said second current regulator comprises a first semiconductor device disposed at an input to the second current regulator for receiving the current in said second line from the customer premises, and a second semiconductor device responsive to the total current flowing from the second current regulator in the second line to the central office, the second semiconductor device being connected to control the first semiconductor device to limit the current from the customer premises so that said total current is less than said second predetermined value.

7. The apparatus of claim 6, wherein said first and second semiconductor devices comprise first and second transistors, respectively, the first transistor being biased to a conducting state by the current from the customer premises flowing into said second current regulator, and the second transistor being biased to a non-conducting state by said total current when said total current is less than said second predetermined value, and the second transistor being connected to the first transistor so as to cause the first transistor to enter a non-conducting state when the total current exceeds said second predetermined value.

8. The apparatus of claim 1, wherein said off hook current comprises a current value that corresponds to a preset value of an off hook current at the central office.

9. Apparatus for powering one or more auxiliary electrical devices in a shared arrangement from a plurality of twisted pairs of telephone lines, the one or more auxiliary electrical devices respectively being associated with one or more of said twisted pairs, comprising, for each of said twisted pairs of said plurality:

a power supply having first and second terminals for connection to said twisted pair at an intermediate location between a central office and a customer premises, the power supply receiving on said first terminal an input voltage and input current from a first line of said twisted pair and converting said input voltage and input current to a preselected output voltage and output current for powering one or more of said auxiliary electrical devices associated with the twisted pair, the second terminal of the power supply providing a return current to a second line of said twisted pair;

a first current regulator adapted to be disposed in the second line of said twisted pair at said intermediate location for receiving current flowing in the second line to the central office from the customer premises, said first current regulator further receiving said return current from the second terminal of said power supply and being responsive to the total current flowing in the second line to the central office for limiting the current from the customer premises such that the total current flowing in the second line is less than a first predetermined value during an off hook condition at the customer premises; and a second current regulator disposed in a return line to said power supply from said one or more associated auxiliary electrical devices for limiting a return current to the power supply from said one or more associated auxiliary electrical devices to a second predetermined value less than an off hook current; and wherein the power supplies of said plurality of twisted pairs have corresponding outputs connected in parallel so as to share in supplying operating current to one or more of the auxiliary electrical devices.

10. The apparatus of claim 9, wherein said power supply comprises a voltage regulator receiving said input voltage and input current and having an output line for providing a regulated voltage and current to a converter, and a third current regulator disposed in said output line for limiting the output current provided to said converter to a value that is less than said off hook current.

11. A method of powering an auxiliary electrical device from a twisted pair of telephone lines, comprising:

receiving at an intermediate location between a central office and a customer premises an input voltage and an input current from a first line of said twisted pair;

converting said input voltage and input current to an output voltage and output current for powering said auxiliary electrical device;

limiting said output current to a first predetermined value less than an off hook current;

providing a return path to a second line of said twisted pair for return current from said auxiliary electrical device;

sensing the total current flowing in said second line to the central office due to the return current flowing in the second line from said return path and another current flowing in said second line from the customer premises; and regulating said other current from the customer premises flowing in the second line such that said total current in the second line is less than a second predetermined value during an off hook condition at the customer premises.

12. The method of claim 11 further comprising sensing said return current from powering said auxiliary electrical device, and limiting said return current to a value that is less than said off hook current.

13. The method of claim 11 further comprising powering said auxiliary electrical device from another twisted pair of lines in a shared power configuration, wherein said receiving, said converting, said limiting, said providing, said sensing, and said regulating are repeated for said other twisted pair to provide another output voltage and output current, and wherein said output voltages and output currents are combined for powering said auxiliary electrical device.

14. The apparatus of claim 1 further comprising a third current regulator that limits the return current from said second terminal of the power supply to said second line of the twisted pair to a value that is less than said off hook current.

15. The apparatus of claim 1, wherein said second predetermined value comprises a value of current that in the absence of current in the second line from the customer premises corresponds to a total current that is less than said off hook current.

16. The apparatus of claim 9, wherein said first predetermined value comprises a value of current that in the absence of current in the second line from the customer premises corresponds to a total current that is less than said off hook current.

17. The method of claim 11, wherein said second predetermined value comprises a value of current that in the absence of current in the second line from the customer premises corresponds to a total current that is less than said off hook current.

* * * * *